US012630747B2

(12) United States Patent
Kitagawa et al.

(10) Patent No.: US 12,630,747 B2
(45) Date of Patent: May 19, 2026

(54) ULTRAVIOLET CURABLE SILICONE ADHESIVE COMPOSITION AND CURED PRODUCT OF SAME

(71) Applicant: SHIN-ETSU CHEMICAL CO., LTD., Tokyo (JP)

(72) Inventors: Taichi Kitagawa, Annaka (JP); Nobuaki Matsumoto, Annaka (JP); Kohei Otake, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 926 days.

(21) Appl. No.: 17/299,598

(22) PCT Filed: Nov. 15, 2019

(86) PCT No.: PCT/JP2019/044825
§ 371 (c)(1),
(2) Date: Jun. 3, 2021

(87) PCT Pub. No.: WO2020/116127
PCT Pub. Date: Jun. 11, 2020

(65) Prior Publication Data

US 2022/0017790 A1 Jan. 20, 2022

(30) Foreign Application Priority Data

Dec. 7, 2018 (JP) ................................ 2018-229752

(51) Int. Cl.
*C09J 7/38* (2018.01)
*C09J 11/04* (2006.01)

(52) U.S. Cl.
CPC ................ *C09J 7/38* (2018.01); *C09J 11/04* (2013.01); *C09J 2203/326* (2013.01); *C09J 2301/302* (2020.08); *C09J 2483/00* (2013.01)

(58) Field of Classification Search
CPC ........ C09J 7/38; C09J 11/04; C09J 2203/326; C09J 2301/302; C09J 2483/00; C09J 183/06; C09J 183/04; C09J 11/06; C09J 11/08; C09J 2301/312; C09J 2301/416; C08G 77/20; C08G 77/70; C08F 290/06
See application file for complete search history.

(56) References Cited

U.S. PATENT DOCUMENTS

| | | | | |
|---|---|---|---|---|
| 6,248,803 | B1 * | 6/2001 | Nakanishi | C08F 30/08 528/33 |
| 2007/0009748 | A1 | 1/2007 | Takanami et al. | |
| 2012/0045635 | A1 | 2/2012 | Aoki | |
| 2013/0220533 | A1 | 8/2013 | Tonegawa et al. | |

FOREIGN PATENT DOCUMENTS

| | | | | |
|---|---|---|---|---|
| CN | 106497505 | A * | 3/2017 | C09J 183/07 |
| JP | 2631098 | B2 | 7/1997 | |
| JP | 2004-155832 | A | 6/2004 | |
| JP | 2005-75959 | A | 3/2005 | |
| JP | 2007-191637 | A | 8/2007 | |
| JP | 5234064 | B2 | 7/2013 | |
| JP | 5825738 | B2 | 12/2015 | |
| JP | 5989417 | B2 | 9/2016 | |
| JP | 2016-190977 | A | 11/2016 | |

(Continued)

OTHER PUBLICATIONS

Zhou et al., machine English translation of CN 106497505 (Year: 2017).*
Feng et al., "Competing Fracture in Kinetically Controlled Transfer Printing," Langmuir, vol. 23, No. 25, 2007, pp. 12555-12560.
International Search Report (PCT/ISA/210) issued in PCT/JP2019/044825, dated Dec. 24, 2019.
Meitl et al., "Transfer printing by kinetic control of adhesion to an elastomeric stamp", Nature Publishing Group, Nature Materials, Dec. 11, 2005, vol. 5, pp. 33-38.
Written Opinion of the International Searching Authority (PCT/ISA/237) issued in PCT/JP2019/044825, dated Dec. 24, 2019.

*Primary Examiner* — Jessica M Roswell
(74) *Attorney, Agent, or Firm* — Birch, Stewart, Kolasch & Birch, LLP

(57) ABSTRACT

An ultraviolet curable silicone adhesive composition which contains (A) an organopolysiloxane represented by formula (1)

(1)

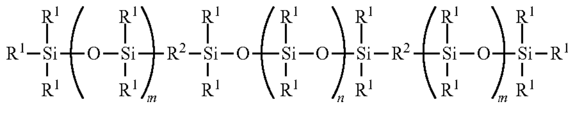

(wherein each $R^1$ represents a polymerizable group or a monovalent hydrocarbon group having 1-20 carbon atoms, provided that at least one of the $R^1$ moieties represents a polymerizable group; $R^2$ represents an oxygen atom or an alkylene group having 1-20 carbon atoms; and m and n represent numbers satisfying $m \geq 0$, $n \geq 1$ and $1 \leq (m+n) \leq 1,000$), (B) an organopolysiloxane resin which is composed of (a) an $R^3{}_3SiO_{1/2}$ unit (wherein $R^3$ represents a monovalent hydrocarbon group having 1-10 carbon atoms) and (b) an $SiO_{4/2}$ unit, with the molar ratio of the unit (a) to the unit (b) being 0.6-1.2:1, (C) a fine silica powder and (D) a photo-polymerization initiator, and which does not contain a (meth)acrylate compound that does not have a siloxane structure. This ultraviolet curable silicone adhesive composition enables the achievement of a cured product that has good shape retainability and little curing shrinkage, while exhibiting excellent adhesiveness if used as a provisional fixing material.

11 Claims, 1 Drawing Sheet

(56) References Cited

FOREIGN PATENT DOCUMENTS

| | | | |
|---|---|---|---|
| WO | WO 2012/036209 | A1 | 3/2012 |
| WO | WO 2019/009026 | A1 | 1/2019 |

* cited by examiner

ULTRAVIOLET CURABLE SILICONE ADHESIVE COMPOSITION AND CURED PRODUCT OF SAME

TECHNICAL FIELD

This invention relates to a UV-curable silicone pressure-sensitive adhesive (PSA) composition and a cured product thereof, and more particularly, to a UV-curable silicone PSA composition and a cured product thereof which can be advantageously used as a temporary adhesive or fixing material for transferring objects.

BACKGROUND ART

Modern electronic tools as typified by smartphones, liquid crystal displays and automotive parts are required to meet not only high performance, but also space and energy savings at the same time. In response to the social demands, electric and electronic parts mounted on such tools are tailored for further size reduction or miniaturization. Their assembly steps become more complicated and difficult annually.

The technology capable of transferring miniaturized chips or parts selectively and simultaneously was recently developed (Non-Patent Document 1), with attention being paid thereon.

This technology is known as micro-transfer-printing technique, including the steps of picking up microscale parts at a time with the adhesive force of elastomer and transferring them to the desired destination having a stronger adhesive force.

PSA articles obtained by applying silicone PSA compositions onto substrates or the like by spin coating or screen printing and curing the coatings are utilized as the micro-transfer-printing material.

Silicone elastomers are known as the PSA material in this application. Many solventless silicone base PSA compositions of heat cure type are proposed (Patent Documents 1 to 3).

On use of the solventless silicone PSA compositions of heat cure type, however, there is the problem that the cured product shrinks upon cooling to room temperature after heat curing, resulting in coated pattern features with increased dimensional errors.

For the purpose of restraining the shrinkage of these materials, a silicone resin which can be briefly cured at room temperature by UV irradiation has been developed (Patent Document 4).

However, there exist some chips or parts which cannot be transferred with very weak adhesive forces that silicone elastomers inherently possess. There is a desire for a silicone PSA of UV cure type which has a stronger adhesive force.

PRIOR ART DOCUMENTS

Patent Documents

Patent Document 1: JP 5825738

Patent Document 2: JP 2631098

Patent Document 3: JP 5234064

Patent Document 4: JP 5989417

Non-Patent Documents

Non-Patent Document 1: John A. Rogers, "Transfer printing by kinetic control of adhesion to an elastomeric stamp," Nature Materials, Nature Publishing Group, 11 Dec. 2005, vol. 6, p. 33-38

SUMMARY OF INVENTION

Technical Problem

An object of the invention, which has been made under the above-mentioned circumstances, is to provide a UV-curable silicone PSA composition which cures into a cured product having satisfactory shape retention, minimal cure shrinkage, and excellent pressure-sensitive adhesion as a temporary adhesive or fixing material, and a cured product thereof.

Solution to Problem

Making extensive investigations to attain the above object, the inventors have found that using an organopolysiloxane having a specific (meth)acryloyloxy-containing group, a specific organopolysiloxane resin, finely divided silica, and a photoinitiator, but not a siloxane structure-free (meth)acrylate compound, there is obtained a UV-curable silicone PSA composition which is quickly cured via UV irradiation while it maintains the desired shape, experiences minimal cure shrinkage, and exhibits a satisfactory pressure-sensitive adhesive force. The invention is predicated on this finding.

The invention is defined below.

1. A UV-curable silicone pressure-sensitive adhesive composition comprising:

(A) 100 parts by weight of an organopolysiloxane having the general formula (1):

[Chem. 1]

(1)

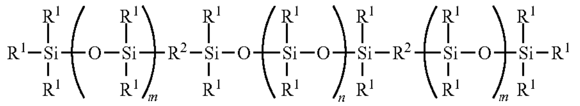

wherein $R^1$ is each independently a polymerizable group selected from acryloyloxyalkyl, methacryloyloxyalkyl, acryloyloxyalkyloxy and methacryloyloxyalkyloxy groups, or a $C_1$-$C_{20}$ monovalent hydrocarbon group, at least one $R^1$ being the polymerizable group, $R^2$ is each independently oxygen or a $C_1$-$C_{20}$ alkylene group, m is a number of at least 0, and n is a number of at least 1, meeting $1 \leq m+n \leq 1{,}000$, (B) 1 to 1,000 parts by weight of an organopolysiloxane resin comprising (a) $R^3{}_3SiO_{1/2}$ units wherein $R^3$ is a $C_1$-$C_{10}$ monovalent hydrocarbon group, and (b) $SiO_{4/2}$ units, a molar ratio of units (a) to units (b) being in the range of from 0.6/1 to 1.2/1, (C) 1 to 100 parts by weight of finely divided silica, and (D) 0.01 to 20 parts by weight of a photopolymerization initiator, the composition not containing a (meth)acrylate compound free of a siloxane structure.

2. The UV-curable silicone pressure-sensitive adhesive composition of 1, which has a ratio of viscosity A as measured at frequency 1 Hz to viscosity B as measured at frequency 10 Hz both at 23° C., i.e., thixotropic ratio A/B of from 1.1 to 10.

3. The UV-curable silicone pressure-sensitive adhesive composition of 1 or 2, wherein the viscosity B as measured at frequency 10 Hz is in the range of 10 to 5,000 Pa·s.

4. A cured product of the UV-curable silicone pressure-sensitive adhesive composition of any one of 1 to 3.

5. A pressure-sensitive adhesive agent comprising the cured product of 4.

6. A pressure-sensitive adhesive sheet comprising the cured product of 4.

7. A microstructure-transferring stamp comprising the cured product of 4.

8. The microstructure-transferring stamp of 7 having at least one protrusion structure.

9. A microstructure-transferring apparatus comprising the microstructure-transferring stamp of 7 or 8.

10. A microstructure-holding substrate having a pressure-sensitive adhesive layer comprising the cured product of 4.

11. A microstructure-transferring apparatus comprising the microstructure-holding substrate of 10.

Advantageous Effects of Invention

The UV-curable silicone PSA composition of the invention is satisfactory in shape retention and workability, and experiences minimal cure shrinkage. Its cured product has excellent pressure-sensitive adhesion as a temporary adhesive or fixing material.

Therefore, the cured product of the UV-curable silicone PSA composition has a sufficient adhesive force to transfer microscopic chips which cannot be transferred with the inherent adhesive forces of silicone elastomers. Also, since the cured product has a good dimensional accuracy due to a minimal cure shrinkage factor, it is useful as the micro-transfer-printing material.

DESCRIPTION OF EMBODIMENTS

Figure 1:
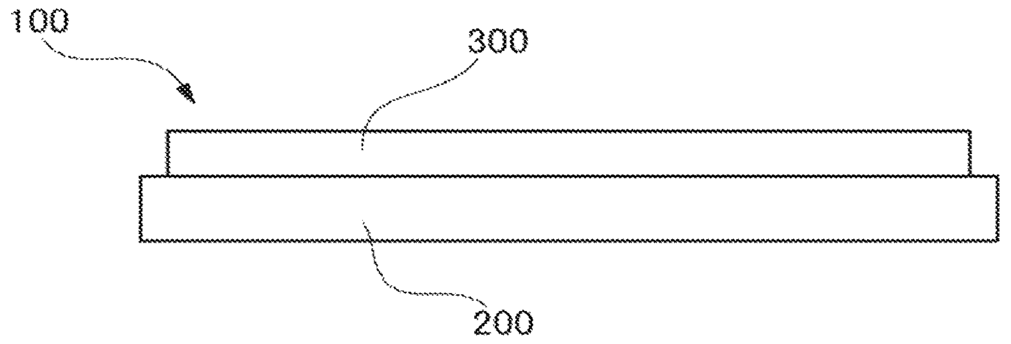
FIG. 1 is a schematic view of one exemplary microstructure-transferring stamp of the invention.

Now the invention is described in detail.

The invention provides a UV-curable silicone pressure-sensitive adhesive (PSA) composition comprising (A) 100 parts by weight of an organopolysiloxane having the general formula (1) shown below, (B) 1 to 1,000 parts by weight of an organopolysiloxane resin comprising (a) $R^3SiO_{1/2}$ units wherein $R^3$ is an unsubstituted or substituted $C_1$-$C_{10}$ monovalent hydrocarbon group, and (b) $SiO_{4/2}$ units, a molar ratio of units (a) to units (b) being in the range of from 0.6/1 to 1.2/1.

(C) 1 to 100 parts by weight of finely divided silica, and (D) 0.01 to 20 parts by weight of a photopolymerization initiator, the composition not containing a (meth)acrylate compound free of a siloxane structure.

(A) Organopolysiloxane

Component (A) used herein serves as a crosslinking component in the inventive composition. It is an organopolysiloxane having the general formula (1).

[Chem. 2]

(1)

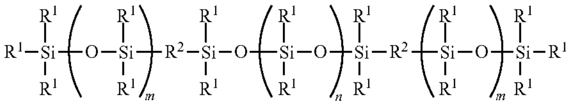

In formula (1), $R^1$ is each independently a polymerizable group selected from acryloyloxyalkyl, methacryloyloxyalkyl, acryloyloxyalkyloxy and methacryloyloxyalkyloxy groups, or a $C_1$-$C_{20}$ monovalent hydrocarbon group, at least one $R^1$ being the polymerizable group, $R^2$ is each independently oxygen or a $C_1$-$C_{20}$ alkylene group, m is a number of at least 0, and n is a number of at least 1, meeting $1 \le m+n \le 1{,}000$.

The $C_1$-$C_{20}$ monovalent hydrocarbon group represented by $R^1$ may be straight, branched or cyclic. Examples thereof include alkyl groups such as methyl, ethyl, n-propyl, isopropyl, n-butyl, isobutyl, tert-butyl, n-hexyl, cyclohexyl, n-octyl, 2-ethylhexyl and n-decyl; alkenyl groups such as vinyl, allyl (or 2-propenyl), 1-propenyl, isopropenyl and butenyl; aryl groups such as phenyl, tolyl, xylyl and naphthyl; and aralkyl groups such as benzyl, phenylethyl and phenylpropyl.

Also included are substituted forms of the foregoing monovalent hydrocarbon groups in which some or all of the carbon-bonded hydrogen atoms are substituted by other substituent groups, for example, halo- and cyano-substituted hydrocarbon groups such as chloromethyl, bromoethyl, trifluoropropyl and cyanoethyl.

Of these, $C_1$-$C_8$ monovalent hydrocarbon groups exclusive of aliphatic unsaturated groups are preferred, $C_1$-$C_8$ alkyl groups and phenyl groups are more preferred, and methyl, ethyl and phenyl are most preferred. It is especially preferred from the aspects of ease of synthesis and economy that at least 90% of $R^1$ be methyl or phenyl.

The alkyl (alkylene) group in the polymerizable group selected from acryloyloxyalkyl, methacryloyloxyalkyl, acryloyloxyalkyloxy, and methacryloyloxyalkyloxy groups, represented by $R^1$, preferably has 1 to 10 carbon atoms, more preferably 1 to 5 carbon atoms although the carbon count is not particularly limited. Examples of the alkyl group include the groups exemplified above for the monovalent hydrocarbon group, but of 1 to 10 carbon atoms.

Specific examples of the polymerizable group are shown below, but not limited thereto.

[Chem. 3]

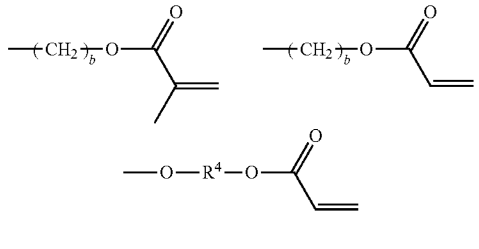

Herein b is a number of 1 to 4, and $R^4$ is a $C_1$-$C_{10}$ alkylene group.

The $C_1$-$C_{10}$ alkylene group $R^4$ may be straight, branched or cyclic. Examples thereof include methylene, ethylene, propylene, trimethylene, tetramethylene, isobutylene, pentamethylene, hexamethylene, heptamethylene, octamethylene, nonamethylene, and decylene, with methylene, ethylene, and trimethylene being preferred.

In the organopolysiloxane of formula (1), at least one of groups $R^1$ is a polymerizable group as mentioned above. Preferably 1 to 6 groups $R^1$ are polymerizable groups, and more preferably 2 to 4 groups $R^1$ are polymerizable groups.

It is noted that the polymerizable group may be positioned at the end or side chain of the molecular chain of the organopolysiloxane. In view of flexibility, the polymerizable group is preferably positioned only at the end.

The $C_1$-$C_{20}$ alkylene group $R^2$ may be straight, branched or cyclic, and examples thereof include methylene, ethylene, propylene, trimethylene, tetramethylene, isobutylene, pentamethylene, hexamethylene, heptamethylene, octamethylene, nonamethylene, and decylene.

Of these, $R^2$ is preferably oxygen, methylene, ethylene, or trimethylene, more preferably oxygen or ethylene.

In formula (1), m is a number of at least 0, and n is a number of at least 1, meeting $1 \leq m+n \leq 1{,}000$, preferably $1 \leq m+n \leq 700$, more preferably $20 \leq m+n \leq 500$. If m+n is less than 1, a compound is volatile. If m+n exceeds 1,000, a composition has a high viscosity and is awkward to handle.

The organopolysiloxane as component (A) should preferably have a viscosity at 25° C. of 10 to 100,000 mPa·s, more preferably 10 to 50,000 mPa·s, from the aspect of improving the workability of the composition and dynamic properties of a cured product thereof. As used herein, the viscosity is measured by a rotational viscometer such as BL, BH, BS, cone plate type or rheometer (the same holds true, hereinafter).

Examples of the organopolysiloxane as component (A) include those having the following formulae (3) and (4), but are not limited thereto. Herein Me stands for methyl and Ph for phenyl.

In formula (4), the siloxane units within parentheses are arranged in an arbitrary order.

Notably, the organopolysiloxane as component (A) may be used alone or in combination of two or more.

(B) Organopolysiloxane Resin

Component (B) serves to impart pressure-sensitive adhesion to cured products. It is an organopolysiloxane resin comprising (a) $R^3{}_3SiO_{1/2}$ units wherein $R^3$ is a $C_1$-$C_{10}$ monovalent hydrocarbon group, and (b) $SiO_{4/2}$ units, a molar ratio of units (a) to units (b) being in the range of from 0.6/1 to 1.2/1.

Examples of the $C_1$-$C_{10}$ monovalent hydrocarbon group $R^3$ include the groups exemplified above for $R^1$, but of 1 to 10 carbon atoms. Preferred among others are $C_2$-$C_6$ alkyl groups such as methyl, ethyl, n-propyl and n-butyl. $C_6$-$C_{10}$ aryl groups such as phenyl and tolyl, $C_7$-$C_{10}$ aralkyl groups such as benzyl, and $C_2$-$C_6$ alkenyl groups such as vinyl, allyl, and butenyl.

Like $R^1$, in the monovalent hydrocarbon group $R^3$, some or all of the carbon-bonded hydrogen atoms may be substituted by other substituent groups as mentioned above.

In component (B), the molar ratio of (a) $R^3{}_3SiO_{1/2}$ units (or M units) to (b) $SiO_{4/2}$ units (or Q units) is in the range of from 0.6/1 to 1.2/1. If the molar ratio of (M units)/(Q units) is less than 0.6, a cured product may lose an adhesive force or tack. If the molar ratio exceeds 1.2, a cured product may lose an adhesive force or holding force.

In order that a cured product have a more appropriate range of adhesive force, holding force or tack, the molar ratio of (M units)/(Q units) preferably ranges from 0.7/1 to 1.2/1.

The amount of component (B) or organopolysiloxane resin added is 1 to 1,000 parts by weight, preferably 5 to 500 parts by weight, more preferably 10 to 300 parts by weight per 100 parts by weight of component (A). If the amount of component (B) is less than 1 part by weight per 100 parts by weight of component (A), a cured product has an insufficient

[Chem. 4]

(3)

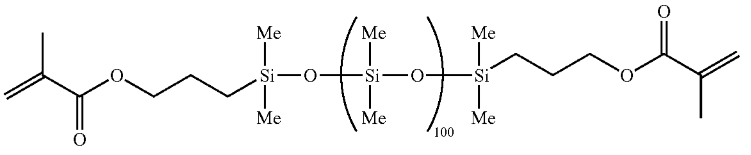

(4)

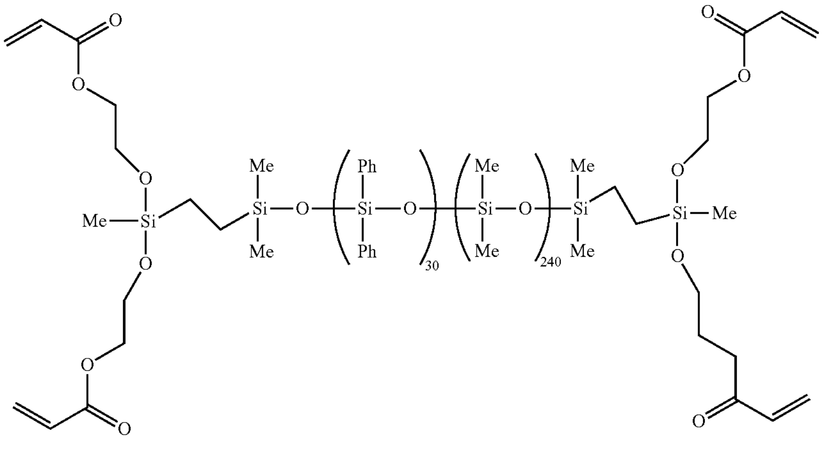

adhesive force. An amount in excess of 1,000 parts by weight brings an extremely high viscosity and poor handling.

(C) Finely Divided Silica

Component (C) mainly serves to impart thixotropy to the composition. Examples of component (C) include fumed silica (dry silica) and precipitated silica (wet silica), with fumed silica (dry silica) being preferred. Blending of component (C) is effective for increasing the hardness of a cured product and suppressing any positional shift during transportation of parts or chips.

The specific surface area of component (C) is preferably 50 to 400 $m^2/g$, more preferably 100 to 350 $m^2/g$, though not particularly limited. If the specific surface area is less than 50 $m^2/g$, the composition may be insufficiently thixotropic. If the specific surface area exceeds 400 $m^2/g$, the composition may have an excessively high viscosity and become poorly workable. It is noted that the specific surface area is measured by the BET method.

The finely divided silica as component (C) may be used alone or in admixture of two or more.

The finely divided silica may be used as such or after treatment with a surface hydrophobizing agent.

In the latter case, finely divided silica which is pretreated with a surface treating agent may be used. Alternatively, a surface treating agent is added during milling of finely divided silica whereby surface treatment is performed at the same time as milling.

Suitable surface treating agents include alkylalkoxysilanes, alkylchlorosilanes, alkylsilazanes, and silane coupling agents. The agents may be used alone, or more than one agent may be added at the same time or at different points of time.

In the inventive composition, the amount of component (C) added is 1 to 100 parts by weight, preferably 5 to 80 parts by weight, more preferably 10 to 50 parts by weight per 100 parts by weight of component (A).

If the amount of component (C) is less than 1 part by weight, the composition does not develop sufficient thixotropy and is poor in shape retention. If the amount of component (C) exceeds 100 parts by weight, the composition becomes extremely viscous and poorly workable.

(D) Photopolymerization Initiator

Examples of the photopolymerization initiator which can be used herein include 2,2-diethoxyacetophenone, 2,2-dimethoxy-1,2-diphenylethan-1-one (Irgacure 651 by BASF), 1-hydroxycyclohexyl phenyl ketone (Irgacure 184 by BASF), 2-hydroxy-2-methyl-1-phenyl-propan-1-one (Irgacure 1173 by BASF), 2-hydroxy-1-{4-[4-(2-hydroxy-2-methylpropionyl)benzyl]phenyl}-2-methyl-propan-1-one (Irgacure 127 by BASF), phenylglyoxylic acid methyl ester (Irgacure MBF by BASF), 2-methyl-1-[4-(methylthio)phenyl]-2-morpholinopropan-1-one (Irgacure 907 by BASF), 2-benzyl-2-dimethylamino-1-(4-morpholinophenyl)-1-butanone (Irgacure 369 by BASF), bis(2,4,6-trimethylbenzoyl) phenylphosphine oxide (Irgacure 819 by BASF), and (2,4,6-trimethylbenzoyl)diphenylphosphine oxide (Irgacure TPO by BASF), which may be used alone or in admixture of two or more.

Of these, 2,2-diethoxyacetophenone, 2-hydroxy-2-methyl-1-phenyl-propan-1-one (Irgacure 1173 by BASF), bis(2,4,6-trimethylbenzoyl)phenylphosphine oxide (Irgacure 819 by BASF), and (2,4,6-trimethylbenzoyl)diphenylphosphine oxide (Irgacure TPO by BASF) are preferred in view of compatibility with component (A).

The amount of the photopolymerization initiator added is 0.01 to 20 parts by weight per 100 parts by weight of component (A). An amount of less than 0.01 part by weight leads to a shortage of cure whereas an amount in excess of 20 parts by weight adversely affects deep section cure.

As mentioned above, a mono- or polyfunctional (meth) acrylate compound free of a siloxane structure is excluded from the UV-curable silicone PSA composition of the invention so as to prevent noticeable cure shrinkage. As used herein, the term "(meth)acrylate" refers to acrylate or methacrylate.

Examples of the monofunctional (meth)acrylate compound free of a siloxane structure include isoamyl acrylate, lauryl acrylate, stearyl acrylate, ethoxy-diethylene glycol acrylate, methoxy-triethylene glycol acrylate, 2-ethylhexyl diglycol acrylate, phenoxyethyl acrylate, phenoxydiethylene glycol acrylate, tetrahydrofurfuryl acrylate, and isobornyl acrylate. Examples of the polyfunctional (meth)acrylate compound free of a siloxane structure include triethylene glycol diacrylate, polytetramethylene glycol diacrylate, neopentyl glycol diacrylate, 1,6-hexane diol diacrylate, dimethyloltricyclodecane diacrylate, trimethylolpropane triacrylate, and pentaerythritol tetraacrylate.

Any of well-known fillers which are used in silicone rubber for the purposes of reinforcement, viscosity adjustment, heat resistance improvement, and flame retardance improvement may be added to the inventive composition insofar as the benefits of the invention are not compromised.

Suitable fillers include reinforcing fillers such as fumed titanium oxide; non-reinforcing fillers such as iron oxide, aluminum oxide, calcium carbonate, and magnesium carbonate, and the foregoing fillers which are treated with organosilicon compounds such as organosilanes and organopolysiloxanes.

In the inventive composition, additives such as silane coupling agents, polymerization inhibitors, antioxidants, oxygen absorbers serving as light-resistance stabilizers, and photo-stabilizers may be blended.

Moreover, the inventive composition may be used in admixture with another resin composition.

The UV-curable silicone PSA composition of the invention may be obtained by mixing and agitating components (A) to (D) and optionally other components in an arbitrary order. The device used in such operation as agitation is not particularly limited and a mortar, three-roll mill, ball mill or planetary mixer may be used. A combination of such devices is acceptable.

From the aspects of shape retention and workability during coating, the UV-curable silicone PSA composition of the invention should preferably have a viscosity of 10 to 5,000 Pa·s, more preferably 10 to 3,000 Pa·s, even more preferably 10 to 1,500 Pa·s, as measured at 23° C. and frequency 10 Hz. The viscosity is measured by a viscosity/viscoelasticity rheometer such as HAAKE MARS.

Also from the aspects of shape retention and workability during coating, the UV-curable silicone PSA composition of the invention should preferably have a ratio of viscosity A as measured at frequency 1 Hz and 23° C. to viscosity B as measured at frequency 10 Hz and 23° C., i.e., thixotropic ratio A/B in the range from 1.1 to 10, more preferably from 1.2 to 8.0.

From the aspect of dimensional accuracy of a cured product, the UV-curable silicone PSA composition of the invention should preferably have a cure shrinkage factor of up to 3.0%, more preferably up to 2.0%, even more preferably up to 1.0%, as computed according to the formula: $(\beta-\alpha)/\alpha\times100$, provided that the uncured composition has a density $\alpha$ and the cured product has a density $\beta$, both measured at 23° C.

The UV-curable silicone PSA composition of the invention quickly cures upon exposure to UV radiation.

Examples of the light source for UV irradiation include UV LED lamps, high-pressure mercury lamps, ultrahigh pressure mercury lamps, metal halide lamps, carbon arc lamps, and xenon lamps.

The dose (or accumulative light quantity) of UV radiation is preferably 1 to 10,000 mJ/$cm^2$, more preferably 10 to 6,000 mJ/$cm^2$ for curing a sheet of about 2.0 mm thick molded from the composition. That is, on use of UV radiation with an illuminance of 100 mW/$cm^2$, UV may be irradiated for about 0.01 to about 100 seconds.

In the practice of the invention, the adhesive force of the cured product obtained through UV irradiation, though not particularly limited, is preferably 0.1 to 100 MPa, more preferably 0.1 to 50 MPa in view of the adhesive force capable of transferring microscopic chips.

The UV-curable silicone PSA composition of the invention may be utilized as PSA articles after coating the composition to various substrates and curing the coating with UV.

As the substrate, plastic films, glass, metals or the like may be used without any limits.

Suitable plastic films include polyethylene film, polypropylene film, polyester film, polyimide film, polyvinyl chloride film, polyvinylidene chloride film, polyvinyl alcohol film, polycarbonate film, polystyrene film, ethylene-vinyl acetate copolymer film, ethylene-vinyl alcohol copolymer film, and triacetylcellulose film.

The glass is not particularly limited in thickness and type, and chemically strengthened glass is acceptable.

For improving the adhesion between a substrate and a PSA layer, the substrate which is previously subjected to primer treatment or plasma treatment may be used.

The coating step may be suitably selected from well-known coating techniques including a spin coater, comma coater, lip coater, roll coater, die coater, knife coater, blade coater, rod coater, kiss coater, gravure coater, screen printing, dip coating, and cast coating.

Since the UV-curable silicone PSA composition of the invention is of solventless type, the potting process using a mold is possible as the means of preparing a cured product.

Although air bubbles can be entrained during pouring into the mold for potting, such bubbles may be removed under reduced pressure. The mold which can be used herein is, for example, a resist mold in which a silicon wafer is provided with a desired protrusion/recess structure using photoresist.

When it is desired to take out the cured product from the mold at the end of curing, the mold is preferably treated with a parting agent prior to the pouring of the composition. Fluorine and silicone based agents may be used as the parting agent.

Most often the UV-curable silicone PSA composition of the invention is used as such. When some improvements in handling and coating to substrates are necessary, it is acceptable that the composition is diluted with an organic solvent prior to use, insofar as the benefits of the invention are not impaired.

Figure 2:
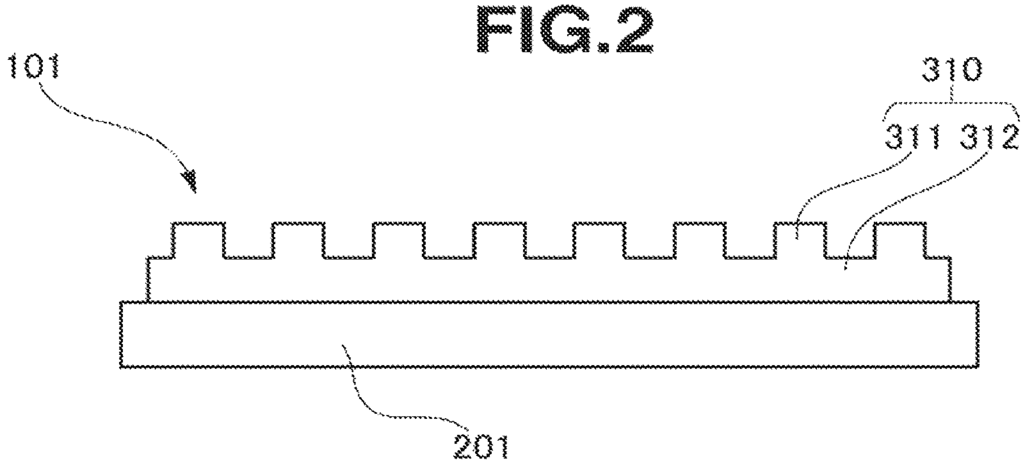
FIG. 2 is a schematic view of another exemplary microstructure-transferring stamp of the invention.

As shown in FIGS. 1 and 2, the cured product of the inventive UV-curable silicone PSA composition may be utilized as microstructure-transferring stamps 100 and 101 for transferring microscopic parts or chips.

Referring to FIG. 1, the microstructure-transferring stamp 100 is constructed as comprising a substrate 200 and a cured product layer 300 of the inventive UV-curable silicone PSA composition thereon. The size of the cured product layer 300 falls within the confines of substrate 200 and may be just equal to the substrate 200.

The material of the substrate 200 is not particularly limited and examples thereof include plastic films, glass, synthetic quartz, metals and the like. Also, the substrate 200 is not particularly limited in thickness and type, and chemically strengthened substrates are acceptable. For improving the adhesion between the substrate and the PSA layer, the substrate which is previously subjected to primer or plasma treatment may be used. Synthetic quartz having a high flatness is advantageously used for suppressing any positional shift during transfer of microstructures to increase the transfer accuracy.

The method of preparing the cured product layer 300 on the substrate 200, which is not particularly limited, may be either a method of directly coating the uncured UV-curable silicone PSA composition on the substrate 200 and curing or a method of bonding a sheet-form cured product of the UV-curable silicone PSA composition to the substrate 200, for example.

In the method of directly coating the UV-curable silicone PSA composition on the substrate 200 and curing, the microstructure-transferring stamp 100 is obtained by coating the silicone PSA composition on the substrate 200 and curing the coating via UV irradiation.

The coating step may be suitably selected from well-known coating techniques including a spin coater, comma coater, lip coater, roll coater, die coater, knife coater, blade coater, rod coater, kiss coater, gravure coater, screen printing, dip coating, and cast coating.

In this method, after the silicone PSA composition is coated onto the substrate, the coating may be cured via UV irradiation while performing press molding or compression molding. Then the microstructure-transferring stamp 100 having a high flatness is obtained.

In the method of bonding a sheet-form cured product of the UV-curable silicone PSA composition to the substrate 200, the microstructure-transferring stamp 100 is obtained by molding the composition into a sheet and bonding the sheet to the substrate 200.

The step of molding the UV-curable silicone PSA composition into a sheet may be suitably selected from molding techniques such as roll molding, press molding, transfer molding, and compression molding. Preferably the sheet-form cured product is molded while it is sandwiched between plastic films, for the purposes of preventing deposition of dust or debris and reducing oxygen inhibition during curing. If the resulting sheet-form cured product is larger than the desired size, it may be cut to the desired size.

For improving the adhesion between the sheet-form cured product and the substrate 200, the bonding surface of either one or both thereof may be subjected to plasma treatment, excimer treatment or chemical treatment. Further, for improving the bonding strength, a PSA or adhesive agent may be used. Examples of the PSA or adhesive agent used herein include silicone, acrylic and epoxy based agents.

The bonding step may use a roll laminator, vacuum press or the like.

The silicone PSA cured product layer 300 in the microstructure-transferring stamp 100 has a thickness of preferably 1 μm to 10 mm, more preferably 10 μm to 5 mm from the aspects of molding and flatness.

Referring to FIG. 2, the microstructure-transferring stamp 101 is constructed as comprising a substrate 201 and a cured product layer 310 of the inventive UV-curable silicone PSA composition thereon. The substrate 201 used herein may be the same as the substrate 200. The silicone PSA cured product layer 310 has protrusion structures 311 on its surface. A base layer 312 may be disposed under the protrusion structures 311.

The method of forming the cured product layer 310 on the substrate 201 is not particularly limited, and examples thereof include a method of directly molding the cured product layer 310 on the substrate 201 via mold shaping or the like, and a method of bonding a sheet-form cured product having the protrusion structures 311 to the substrate 201.

Figure 3:
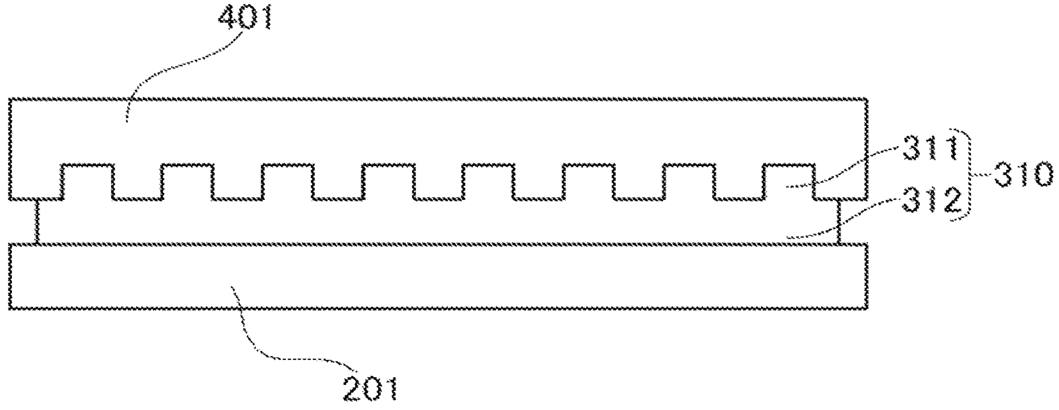
FIG. 3 is a schematic view of one exemplary method for preparing a microstructure-transferring stamp of the invention.

In the method of directly molding the cured product layer 310 on the substrate 201 via mold shaping, the microstructure-transferring stamp 101 is obtained by charging the silicone PSA composition between the substrate 201 and a mold 401, curing the composition via UV irradiation, and removing the mold 401 as shown in FIG. 3.

The mold 401 used herein may be, for example, a resist mold obtained by forming a protrusion/recess pattern of photoresist on a silicon wafer or quartz substrate, or a resin mold obtained by patternwise exposing a UV-curable resin to UV to form a protrusion/recess pattern. In the case of the resin mold, various plastic films may be used as the support.

The step of charging the silicone PSA composition between the substrate 201 and the mold 401 may include coating the silicone PSA composition to either one or both of the substrate 201 and the mold 401 and bonding them together. The coating and bonding steps may use the above-mentioned techniques. Although there is a possibility that tiny bubbles are left in the mold 401 during coating, the problem can be solved by vacuum bonding or debubbling under reduced pressure.

The microstructure-transferring stamp 101 is obtained by coating the silicone PSA composition to the substrate by any of the aforementioned techniques, and curing the composition via UV irradiation while performing press molding, compression molding or roll press molding.

Alternatively, the microstructure-transferring stamp 101 is obtained by the technique of printing the silicone PSA composition through a mesh screen having the desired pattern, and curing the composition via UV irradiation. Since the silicone PSA composition of the invention has satisfactory shape retention, the desired pattern shape is not deformed from the coating step to the end of curing step.

In the method of bonding a sheet-form cured product having the protrusion structures 311 to the substrate 201, the microstructure-transferring stamp 101 is obtained by molding the silicone PSA composition into a sheet-form cured product having the protrusion structures 311 and bonding it to the substrate 201.

The step of molding the UV-curable silicone PSA composition into a sheet-form cured product having protrusion structures 311 may be suitably selected from molding techniques such as roll molding, press molding, transfer molding, and compression molding in a mold having the same protrusion/recess pattern as the mold 401.

Preferably the sheet-form cured product is molded while it is sandwiched between plastic films, for the purposes of preventing deposition of dust or debris and reducing oxygen inhibition during curing. If the resulting sheet-form cured product is larger than the desired size, it may be cut to the desired size.

For improving the adhesion between the sheet-form cured product and the substrate 201, the bonding surface of them may be subjected to plasma treatment, excimer treatment or chemical treatment. Further, for improving the bonding strength, any of the aforementioned PSA or adhesive agents may be used.

The bonding step may use a roll laminator, vacuum press or the like.

The size and arrangement of the protrusion structures 311 may be designed in accordance with the desired size and arrangement of microstructures to be transferred.

The top surface of the protrusion structure 311 is flat while its planar shape is not limited and may be circular, oval or rectangular. In the case of a rectangular protrusion structure, the edges may be rounded. The top surface of the protrusion structure 311 has a width of preferably 0.1 μm to 10 mm, more preferably 1 μm to 1 mm.

The side surface of the protrusion structure 311 is not limited in shape and may be either perpendicular or oblique.

The protrusion structure 311 has a height of preferably 0.1 μm to 10 mm, more preferably 1 μm to 1 mm.

Adjacent protrusion structures 311 are spaced apart at a pitch of preferably 0.1 μm to 100 mm, more preferably 1 μm to 1 mm.

The base layer 312 has a thickness of preferably 0.1 μm to 10 mm, more preferably 1 μm to 5 mm.

The microstructure-transferring stamp defined above may be mounted to a tool and utilized as a microstructure transferring apparatus. The means of mounting to a tool is not limited and may be vacuum chucking. PSA sheet or the like. The microstructure-transferring apparatus operates to transfer microstructures such as chips by picking up the microstructures via adhesion of the microstructure-transferring stamp, moving to the desired destination, and releasing the microstructures.

For example, in the laser lift-off (LLO) process of lifting off a sapphire substrate from a GaN based compound crystal layer of a semiconductor device using laser light, the microstructure-transferring stamps 100 and 101 shown in FIGS. 1 and 2 may be used as a microstructure-holding substrate (donor substrate) for temporarily fixing the separated semiconductor chips to prevent any positional shift. By performing laser irradiation in the state that the microstructure-holding substrate is adhesively bonded to semiconductor chips, the separated semiconductor chips are transferred and temporarily fixed on the microstructure-holding substrate.

Further, using the microstructure-transferring stamp 100 or 101 having a greater adhesive bonding force than the microstructure-holding substrate, the semiconductor chips temporarily fixed onto the microstructure-holding substrate can be selectively picked up. Thereafter, the picked-up semiconductor chips are moved to the desired position on a substrate on which they are to be mounted, the semiconductor chips are bonded to the mounting substrate by soldering, and the microstructure-transferring stamp is separated from the semiconductor chips. In this way, the steps of transferring and mounting of semiconductor chips to and on a substrate are accomplished.

EXAMPLES

Examples are given below for further illustrating the invention although the invention is not limited to these Examples.

It is noted that the following compounds are used as various components in Examples. Herein Me stands for methyl, and Ph for phenyl.

Component (A)

[Chem. 5]

(A-1)

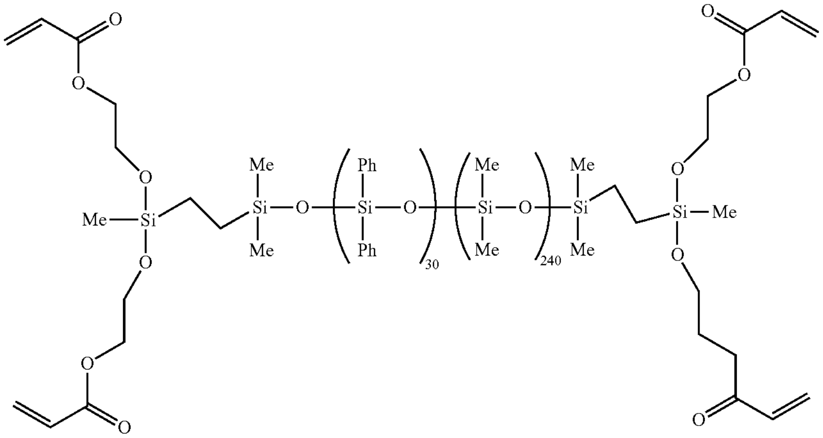

(A-2)

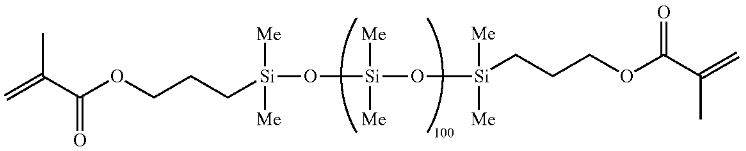

In formula (A-1), the siloxane units in parentheses are arranged in an arbitrary order.

Component (B)

60 wt % toluene solution of an organopolysiloxane resin containing $Me_3SiO_{1/2}$ units and $SiO_2$ units wherein a molar ratio of $Me_3SiO_{1/2}$ units to $SiO_2$ units is 0.85 and having a number average molecular weight of 3,500

Component (C)

dry silica (Reolosil DM-30S by Tokuyama Corp., specific surface area 230 $m^2/g$)

Component (D)

2-hydroxy-2-methyl-1-phenyl-propan-1-one (Irgacure 1173 by BASF Japan)

Component (E)

isobornyl acrylate (Light Acrylate IB-XA by Kyoeisha Chemical Co., Ltd.)

Examples 1 to 4 and Reference Examples 1, 2

Each of the silicone compositions in Table 1 was prepared by mixing components (A) and (B) in the proportion in Table 1, distilling off toluene at 100° C. under reduced pressure, adding components (C) to (E) in the proportion in Table 1, and mixing on a planetary mixer.

The viscosity of the compositions in Table 1 is measured at 23° C. and frequency 10 Hz by a viscosity/viscoelasticity rheometer (HAAKE MARS). The thixotropic ratio is computed as a ratio A/B of viscosity A at 23° C. and frequency 1 Hz to viscosity B at 23° C. and frequency 10 Hz.

Using Eye UV electron controller (model UBX0601-01 by Eye Graphics Co., Ltd.), each of the silicone compositions thus prepared was cured in nitrogen atmosphere at room temperature (25° C.) by irradiating UV radiation of wavelength 365 nm in a UV dose of 8,000 $mJ/cm^2$. The sheet had a thickness of 2.0 mm. The cured product was measured for hardness according to JIS-K6249.

The adhesive bonding force of the cured product was measured by a compact table-top tester EZ-SX (Shimadzu Corp.).

Specifically, a stainless steel (SUS) probe of 1 mm square was pressed against the cured product in the form of 1-mm thick sheet at 1 MPa for 15 seconds, after which a load required in pulling back the probe at a speed of 200 mm/min was measured.

The density of an uncured composition and the density of a cured product were measured according to JIS-K6249.

The cure shrinkage factor (%) is computed according to the formula: $(\beta-\alpha)/\alpha\times100$, from the density $\alpha$ of the uncured composition and the density $\beta$ of the cured product.

TABLE 1

| | | Example | | | | Reference Example | |
|---|---|---|---|---|---|---|---|
| | | 1 | 2 | 3 | 4 | 1 | 2 |
| Composition (pbw) | A-1 | 100 | 100 | | | 100 | |
| | A-2 | | | 100 | 100 | | 100 |
| | B | 133 | 72 | 250 | 112 | 167 | 100 |
| | C | 16 | 21 | 10 | 17 | 35 | 30 |
| | D | 2 | 2 | 2 | 2 | 2 | 2 |
| | E | | | | | 20 | 20 |

TABLE 1-continued

| | | Example | | | | Reference Example | |
|---|---|---|---|---|---|---|---|
| | | 1 | 2 | 3 | 4 | 1 | 2 |
| Physical properties of composition | Viscosity (Pa · s) | 78.9 | 65.9 | 331.8 | 22.0 | 24.3 | 137.8 |
| | Thixotropic ratio | 1.3 | 2.3 | 1.5 | 4.6 | 1.8 | 4.9 |
| | Uncured density α ($g/cm^3$) | 1.126 | 1.133 | 1.104 | 1.102 | 1.118 | 1.076 |
| Physical properties of cured product | Hardness (Type A) | 20 | 30 | 15 | 19 | 57 | 59 |
| | Adhesive force (MPa) | 0.34 | 0.15 | 0.93 | 0.13 | 0.98 | 0.94 |
| | Cured density β ($g/cm^3$) | 1.129 | 1.138 | 1.107 | 1.103 | 1.159 | 1.120 |
| | Cure shrinkage factor (%) | 0.31 | 0.41 | 0.32 | 0.05 | 3.68 | 4.1 |

As seen from Table 1, the UV-curable silicone PSA compositions prepared in Examples 1 to 4 have satisfactory shape retention and workability. Their cured products have sufficient adhesive forces. Since they do not contain isobornyl acrylate which is a siloxane structure-free (meth)acrylate compound, as component (E), they have a low cure shrinkage factor and a good dimensional accuracy.

In contrast, the compositions prepared in Reference Examples 1 and 2 are satisfactory with respect to shape retention, workability, and the adhesive force of cured products, and practically acceptable as the micro-transfer-printing material, but show a high cure shrinkage factor and a low dimensional accuracy because of component (E) being contained, as compared with the compositions of Examples.

REFERENCE SIGNS LIST

100, 101: microstructure-transferring stamp
200, 201: substrate
300, 310: cured product layer
311: protrusion structure
312: base layer
401: mold

The invention claimed is:

1. A UV-curable silicone pressure-sensitive adhesive composition comprising:

(A) 100 parts by weight of an organopolysiloxane having the general formula (1):

[Chem. 1]

(1)

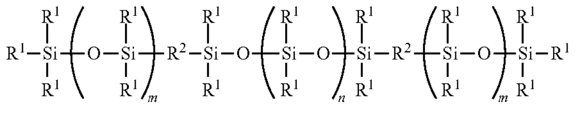

wherein $R^1$ is each independently a polymerizable group selected from acryloyloxyalkyl, methacryloyloxyalkyl, acryloyloxyalkyloxy and methacryloyloxyalkyloxy groups, or a $C_1$-$C_{20}$ monovalent hydrocarbon group, at least one $R^1$ being the polymerizable group, $R^2$ is each independently oxygen or a $C_1$-$C_{20}$ alkylene group, m is a number of at least 0, and n is a number of at least 1, meeting $1 \leq m+n \leq 1{,}000$, wherein said polymerizable group is positioned only at the end of the molecular chain of the organopolysiloxane, (B) 1 to 1,000 parts by weight of an organopolysiloxane resin consisting of (a) $R^3{}_3SiO_{1/2}$ units wherein $R^3$ is a $C_2$-$C_6$ alkyl group, $C_6$-$C_{10}$ aryl group, $C_7$-$C_{10}$ aralkyl group, or $C_2$-$C_6$ alkenyl group, and (b) $SiO_{4/2}$ units, a molar ratio of units (a) to units (b) being in the range of from 0.6/1 to 1.2/1, (C) 1 to 100 parts by weight of finely divided silica, and (D) 0.01 to 20 parts by weight of a photopolymerization initiator, the composition not containing a (meth)acrylate compound free of a siloxane structure.

2. The UV-curable silicone pressure-sensitive adhesive composition of claim 1, which has a ratio of viscosity A as measured at frequency 1 Hz to viscosity B as measured at frequency 10 Hz both at 23° C. of from 1.1 to 10.

3. The UV-curable silicone pressure-sensitive adhesive composition of claim 1, wherein the viscosity B as measured at frequency 10 Hz is in the range of 10 to 5,000 Pa·s.

4. A cured product of the UV-curable silicone pressure-sensitive adhesive composition of claim 1.

5. A pressure-sensitive adhesive agent comprising the cured product of claim 4.

6. A pressure-sensitive adhesive sheet comprising the cured product of claim 4.

7. A microstructure-transferring stamp comprising the cured product of claim 4.

8. The microstructure-transferring stamp of claim 7 having at least one protrusion structure.

9. A microstructure-transferring apparatus comprising the microstructure-transferring stamp of claim 7.

10. A microstructure-holding substrate having a pressure-sensitive adhesive layer comprising the cured product of claim 4.

11. A microstructure-transferring apparatus comprising the microstructure-holding substrate of claim 10.

* * * * *